US011219017B2

(12) United States Patent
Li et al.

(10) Patent No.: US 11,219,017 B2
(45) Date of Patent: Jan. 4, 2022

(54) MULTIPLEXING DIFFERENT SERVICES IN WIRELESS COMMUNICATIONS

(71) Applicant: QUALCOMM Incorporated, San Diego, CA (US)

(72) Inventors: Chong Li, Weehawken, NJ (US); Jing Jiang, San Diego, CA (US); Junyi Li, Chester, NJ (US); Karl Georg Hampel, Hoboken, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/921,148

(22) Filed: Mar. 14, 2018

(65) Prior Publication Data

US 2018/0270816 A1    Sep. 20, 2018

Related U.S. Application Data

(60) Provisional application No. 62/481,050, filed on Apr. 3, 2017, provisional application No. 62/472,389, filed on Mar. 16, 2017.

(51) Int. Cl.
*H04W 72/04* (2009.01)
*H04W 72/12* (2009.01)
(Continued)

(52) U.S. Cl.
CPC ...... *H04W 72/0446* (2013.01); *H04B 7/2656* (2013.01); *H04W 72/048* (2013.01);
(Continued)

(58) Field of Classification Search
CPC ............. H04W 16/14; H04W 72/0446; H04W 72/042; H04W 72/0453; H04W 72/1242;
(Continued)

(56) References Cited

U.S. PATENT DOCUMENTS

2011/0201371 A1\*    8/2011    Kwon ................. H04W 72/082
                                                                 455/509
2017/0295592 A1    10/2017    Yang et al.
(Continued)

FOREIGN PATENT DOCUMENTS

WO    WO-2017/177083 A1    10/2017
WO    WO-2017/184850 A1    10/2017
(Continued)

OTHER PUBLICATIONS

Fujitsu: "Discussion on Preemption Indicator for Multiplexing eMBB and URLLC in Downlink", 3GPP Draft; R1-1701920 Preemption Based Multiplexing for EMBB and URLLC, 3rd Generation Partnership Project (3GPP), Mobile Competence Centre; 650, Route Des Lucioles; F-06921, Sophia-Antipolis Cedex; France, vol. RAN WG1, No. Athens. Greece; Feb. 13, 2017-Feb. 17, 2017 Feb. 12, 2017, XP051209082, Retrieved from the Internet: URL:http://www.3gpp.org/ftp/Meetings_3GPP_SYNC/RAN1/Docs/ [retrieved on Feb. 12, 2017], 5 pages.
(Continued)

*Primary Examiner* — Elton Williams
(74) *Attorney, Agent, or Firm* — Arent Fox, LLP

(57) ABSTRACT

Aspects of the present disclosure describe receiving control data for a slot of a first wireless service, where the control data indicates one or more partial slots of the slot that are intended for communications of the first wireless service. An indicator indicating whether data of the first wireless service is transmitted over at least one of the one or more partial slots can be received at a different time than the control data. The data of the first wireless service over the at least one of the one or more partial slots can be decoded based at least in part on the indicator.

28 Claims, 10 Drawing Sheets

(51) Int. Cl.
  *H04B 7/26* (2006.01)
  *H04W 72/00* (2009.01)
(52) U.S. Cl.
  CPC ... *H04W 72/0453* (2013.01); *H04W 72/1273* (2013.01); *H04W 72/005* (2013.01); *H04W 72/042* (2013.01)
(58) Field of Classification Search
  CPC ......... H04W 72/1273; H04W 72/0406; H04W 72/044; H04W 72/005; H04W 72/048; H04W 72/1215; H04W 72/1247; H04L 5/0092; H04B 7/2656
  See application file for complete search history.

(56) References Cited

U.S. PATENT DOCUMENTS

| 2018/0063858 | A1* | 3/2018 | Au | H04L 5/0048 |
| 2018/0063865 | A1* | 3/2018 | Islam | H04W 76/27 |
| 2019/0116592 | A1* | 4/2019 | Moon | H04L 5/0044 |

FOREIGN PATENT DOCUMENTS

| WO | WO-2018/036560 A1 | 3/2018 |
| WO | 2018061159 A1 | 4/2018 |
| WO | 2018144203 A1 | 8/2018 |

OTHER PUBLICATIONS

International Search Report and Written Opinion—PCT/US2018/022706—ISA/EPO—dated Sep. 11, 2018.
NTT Docomo Inc: "On Dynamic Multiplexing of eMBB and URLLC for Downlink", R1-1702817, 3rd Generation Partnership Project (3GPP), Mobile Competence Centre, 650, Route Des Lucioles, F-06921 Sophia-Antipolis, vol. RAN WG1, No. Athens. Greece; Feb. 13, 2017-Feb. 17, 2017, Feb. 12, 2017, XP051209962, Retrieved from the Internet: URL:http://www.3gpp.org/ftp/Meetings_3GPP_SYNC/RAN1/Docs/ [retrieved on Feb. 12, 2017], 4 pages.
Sequans Communications: "Preemption-Based Multiplexing of URLLC and eMBB in DL", 3GPP Draft, R1-1702117, Preemption-Based Multiplexing of URLLC and EMBB in DL, 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017, Feb. 12, 2017 (Feb. 12, 2017), XP051209277, 5 Pages, Retrieved from the Internet: URL: http://www.3gpp.org/ftp/Meetings_3GPP_SYNC/RAN1/Docs/ [retrieved on Feb. 12, 2017].
Ericsson: "On eMBB/URLLC multiplexing for downlink", 3GPP Draft; R1-1701869, 3rd Generation Partnership Project (3GPP), Mobile Competence Centre; 650, Route Des Lucioles; F-06921, Sophia-Antipolis Cedex; France, vol. RAN WG1, Athens, Greece; Feb. 13, 2017-Feb. 17, 2017, Feb. 6, 2017 (Feb. 6, 2017), XP051220653, 5 pages, Retrieved from the Internet: URL: http://www.3gpp.org/ftp/tsg_ran/WG1_RL1/TSGR1_88/Docs/ [retrieved on Feb. 6, 2017].
Partial International Search Report—PCT/US2018/022706—ISA/EPO—dated Jun. 15, 2018, 17 pages.
ZTE., et al., "About URLLC and eMBB multiplexing in downlink", 3GPP Draft; R1-1700264, 3rd Generation Partnership Project (3GPP), Mobile Competence Centre, 650, Route Des Lucioles; F-06921, Sophia-Antipolis Cedex; France, vol. RAN WG1, Spokane, USA; Jan. 16, 2017-Jan. 20, 2017, Jan. 10, 2017 (Jan. 10, 2017), XP051202767, 10 pages, Retrieved from the Internet: URL:http://www.3gpp.org/ftp/tsg_ran/WG1_RL1/TSGR1_AH/NR_AH_1701/Docs/ [retrieved on—Jan. 10, 2017].
Fujitsu: "DL Control Channel Related to Multiplexing eMBB and URLLC", 3GPP TSG RAN WG1 Meeting #87, R1-1611465, Reno, USA Nov. 14-18, 2016, 4 Pages.
Huawei H., "DL URLLC Multiplexing Considerations", 3GPP TSG RAN WG1 Meeting#87, R1-1611222, Reno, USA Nov. 14-18, 2016, 8 Pages.
Qualcomm Incorporated: "DL URLLC/eMBB Dynamic Multiplexing and Indication Design", 3GPP Draft, 3GPP TSG-RAN WG1 #88, R1-1702639 DL URLLCEMBB Dynamic Multiplexing and Indication Design, 3rd Generation Partnership Project (3GPP), Athens, Greece; Feb. 13, 2017-Feb. 17, 2017, Feb. 12, 2017 (Feb. 12, 2017), 9 Pages, XP051209790, part 2.
Qualcomm Incorporated: "DL URLLC/eMBB Dynamic Multiplexing and Indication Design", 3GPP Draft, 3GPP TSG-RAN WG1 #88, R1-1702639 DL URLLCEMBB Dynamic Multiplexing and Indication Design, 3rd Generation Partnership Project (3GPP), Mobile Competence Centre; 650, Route Des Lucioles; F-06921 Sophia-Antipolis, vol. RAN WG1, No. Athens, Greece; Feb. 13, 2017-Feb. 17, 2017, Feb. 12, 2017 (Feb. 12, 2017), 9 Pages, XP051209790, Retrieved from the Internet: URL: http://www.3gpp.org/ftp/Meetings_3GPP_SYNC/RAN1/Docs/ [retrieved on Feb. 12, 2017], part 2.

\* cited by examiner

MULTIPLEXING DIFFERENT SERVICES IN WIRELESS COMMUNICATIONS

CLAIM OF PRIORITY UNDER 35 U.S.C. § 119

The present application for patent claims priority to and benefit of Provisional Application No. 62/472,389, entitled "MULTIPLEXING DIFFERENT SERVICES IN WIRELESS COMMUNICATIONS" filed Mar. 16, 2017, and Provisional Application No. 62/481,050, entitled "PRE-CONFIGURATION INDICATION FOR ENHANCED MOBILE BROADBAND AND LOW LATENCY COMMUNICATION MULTIPLEXING" filed Apr. 3, 2017, which are both assigned to the assignee hereof and hereby expressly incorporated by reference herein for all purposes as if fully set forth below.

TECHNICAL FIELD

Aspects of the present disclosure relate generally to wireless communication systems, and more particularly, to multiplexing communications of different services. Embodiments can enable and provide multiplexing, for example, based on using a control data region to schedule intended resources for communications using a service or based on using a separate indicator channel indicating whether intended resources include communications from the service (or from another service). This can allow for decreasing use of spectrum resources that may otherwise be required to indicate multiplexing information.

INTRODUCTION

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems. These multiple access technologies have been adopted in various telecommunication standards to provide a common protocol that enables different wireless devices to communicate on a municipal, national, regional, and even global level.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The technology and technical features discussed in this application may be utilized in communication network technology including a fifth generation (5G) wireless communications technology. This may be referred to as 5G new radio (5G NR). 5G will expand and support diverse usage scenarios and applications with respect to current mobile network generations. In an aspect, 5G communications technology can include services such as: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In 5G, eMBB and URLLC services may be transmitted based on different transmission durations. Sample timing durations or intervals may be a slot for eMBB and a partial slot for URLLC. In addition, URLLC communications may be associated with a higher nominal reliability and lower nominal latency than eMBB. Also, URLLC communication may be transmitted in shorter, more frequent transmission time intervals (TTIs) and/or may use different retransmission or other reliability mechanisms relative to eMBB. To multiplex these services, embodiments of the technology discussed below can include preemption-based multiplexing. This multiplexing approach can include indicators at each time division of a URLLC partial slot to indicate whether URLLC is transmitted over resources scheduled for eMBB communications in the partial slot.

Preemption-based multiplexing requires that base stations send indicator channels periodically. These indicators can generally include various parameters related to the URLLC communications. In some scenarios, the indicators may request that UEs receiving eMBB communications decode each indicator channel at each URLLC partial slot. Doing so can aid in helping to determine resources in the partial slot can be punctured with URLLC communications and/or whether to disregard the URLLC partial slot portion of the eMBB slot. While this may be beneficial to URLLC UEs that are attempting to decode URLLC communications by allowing the URLLC UEs to determine which partial slots can be decoded and which can be skipped, decoding this indicator channel may use significant processing resources and may consume spectrum resources based on the number and/or size of URLLC-related parameters being communicated. In addition, decoding of the eMBB data may cause undesirable results if the indicator channel is not properly decoded, as rate-matching for the eMBB data would be accordingly performed to include the URLLC-punctured resources.

Scheduling-based multiplexing has also been proposed where eMBB and URLLC communications are frequency division multiplexed and independently scheduled. Scheduling-based multiplexing, however, may be inefficient as URLLC traffic is unpredictable (and thus resources may be wasted where the URLLC traffic is not present), may have excessive URLLC control overhead in a coexistence region, may have excessive reference signal overhead in the coexistence region, and/or may cause excessive power consumption at a UE monitoring control for eMBB and/or URLLC.

According to an example, a method for receiving wireless communications is provided. The method includes receiving, at a user equipment (UE), control data for a slot corresponding to a first wireless service, where the control data indicates one or more partial slots of the slot that are intended for communications of the first wireless service, receiving, at the UE at a different time than the control data, an indicator indicating whether data of the first wireless service is transmitted for the UE over at least one of the one or more partial slots, and decoding, at the UE, the data of the first wireless service from the at least one of the one or more partial slots based at least in part on the indicator.

In another example, a method for transmitting wireless communications is provided. The method includes transmitting, by an access point, control data for a slot of a first wireless service, wherein the control data indicates one or more partial slots of the slot that are intended for communications of the first wireless service for a corresponding UE, transmitting, by the access point at a different time than the control data, an indicator indicating whether data of the first wireless service is transmitted for the UE over at least one of the one or more partial slots, and transmitting, by the access point and based on the indicator, data of the first wireless service or data of a second wireless service over resources in the at least one of the one or more partial slots.

In another example, a method for receiving wireless communications is provided that includes receiving, at a UE that communicates using a first wireless service, an allocation identifier from an access point, wherein the allocation identifier indicates a resource allocation related to a second wireless service, and receiving, by the UE, one or more indicators from the access point indicating that one or more corresponding partial slots of a slot of the first wireless service include resources that are punctured for communications of the second wireless service. The method also includes determining, by the UE and based on the allocation identifier, a location of the resources that are punctured within the one or more corresponding partial slots, and decoding, by the UE and around the location of the resources, data of the first wireless service over the slot including the one or more corresponding partial slots.

Still in another example, a method for transmitting wireless communications is provided that includes transmitting, to one or more UEs that use a first wireless service, an allocation identifier to indicate a resource allocation related to a second wireless service, and transmitting, to the one or more UEs, one or more indicators indicating that one or more corresponding partial slots of a slot of the first wireless service includes resources that are punctured for communications of the second wireless service. The method may also include puncturing resources of the first wireless service, at one or more locations corresponding to the allocation identifier, for the communications of the second wireless service, transmitting, to one or more other UEs, the communications of the second wireless service over the resources, and/or transmitting, to the one or more UEs, data related to the first wireless service over one or more resources in the slot other than the resources that are punctured for the communications of the second wireless service.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for receiving wireless communications can include a transceiver for communicating one or more wireless signals via one or more antennas, a memory configured to store instructions, and one or more processors communicatively coupled with the transceiver and the memory. The one or more processors may be configured to receive control data for a slot corresponding to a first wireless service, wherein the control data indicates one or more partial slots of the slot that are intended for communications of the first wireless service, receive, at a different time than the control data, an indicator indicating whether data of the first wireless service is transmitted for the apparatus over at least one of the one or more partial slots, and decode the data of the first wireless service from the at least one of the one or more partial slots based at least in part on the indicator.

In yet another example, an apparatus for receiving wireless communications may include a transceiver for communicating one or more wireless signals via one or more antennas, a memory configured to store instructions, and one or more processors communicatively coupled with the transceiver and the memory. The one or more processors may be configured to receive, using a first wireless service, an allocation identifier from an access point, wherein the allocation identifier indicates a resource allocation related to a second wireless service, receive one or more indicators from the access point indicating that one or more corresponding partial slots of a slot of the first wireless service include resources that are punctured for communications of the second wireless service, determine, based on the allocation identifier, a location of the resources that are punctured within the one or more corresponding partial slots, and decode, around the location of the resources, data of the first wireless service over the slot including the one or more corresponding partial slots.

In another example, an apparatus for receiving wireless communications can include means for receiving control data for a slot corresponding to a first wireless service, where the control data indicates one or more partial slots of the slot that are intended for communications of the first wireless service, means for receiving, at a different time than the control data, an indicator indicating whether data of the first wireless service is transmitted for the apparatus over at least one of the one or more partial slots, and means for decoding the data of the first wireless service from the at least one of the one or more partial slots based at least in part on the indicator.

In yet another example, an apparatus for receiving wireless communications may include means for receiving, using a first wireless service, an allocation identifier from an access point, where the allocation identifier indicates a resource allocation related to a second wireless service, means for receiving one or more indicators from the access point indicating that one or more corresponding partial slots of a slot of the first wireless service include resources that are punctured for communications of the second wireless service, means for determining, based on the allocation identifier, a location of the resources that are punctured within the one or more corresponding partial slots, and means for decoding, around the location of the resources, data of the first wireless service over the slot including the one or more corresponding partial slots.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed.

In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
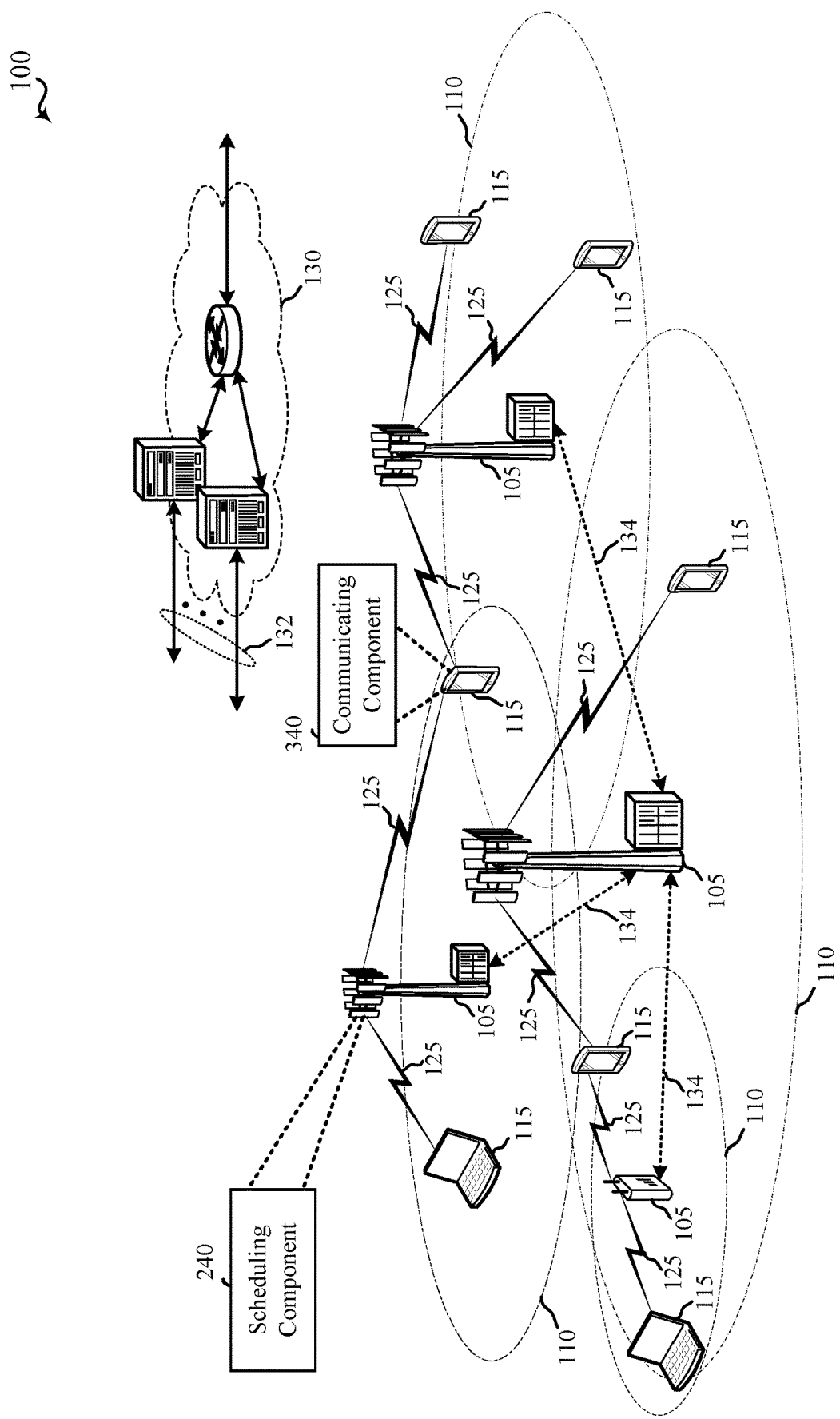
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to multiplexing communications from different services in wireless communications. Spectrum resources can be used to indicate that multiplexing can be minimized. For example, multiplexing can be achieved based on using a control data region to schedule intended resources for communications using a service. Multiplexing may also be implemented via a separate indicator channel indicating whether intended resources include communications from the service (or from another service).

In an example, a slot of a first wireless service may include a control data portion scheduling intended resources for data communications of the first wireless service to one or more UEs. The slot may also include one or more indicators, corresponding to each of multiple partial slots within the slot, indicating whether each of the multiple partial slots includes data of the first wireless communication service (and/or data of a second wireless communication service) over the intended resources. Accordingly, in this example, a UE can determine partial slots of a first wireless service slot having intended resources for data communications of the first wireless service based on the associated control data portion, and then can determine whether the intended resources include the data of the first wireless service based on the indicator for each partial slot. The UE can accordingly receive and decode the data in the partial slots corresponding to the intended resources that also have a corresponding indicator indicating presence of data, without necessarily having to decode all indicators in all partial slots of the slot (e.g., where intended resources are not scheduled over all partial slots of the slot for the given UE).

For example, this can allow an access point to transmit data of the first wireless service, and to transmit data of a second wireless service, which may be punctured at the resources used to transmit data of the first wireless service. For example, puncturing can refer to transmitting data of the second wireless service in a given period of time instead of scheduled data of the first wireless service. The access point can accordingly indicate, via the corresponding indicator, whether resources intended for including data of the first wireless service indeed include such data or whether the resources do not include data of the first wireless service (e.g., are punctured with data from the second wireless service), in which case the UE expecting data of the first wireless service can refrain from receiving and/or decoding/processing the indicated resources and/or can perform rate matching around the indicated resources. In addition, in this example, if decoding of the indicators fails, decoding of the data of the first wireless service over the corresponding partial slot(s) may not be performed (and possible decoding errors may be avoided), whereas in the conventional preemption-based multiplexing described above, failure in decoding an indicator channel may result in decoding of the data of the first wireless service in the corresponding partial slot(s) though resources may be punctured.

In another example, the multiplexing can be achieved based on configuring an access point and UE with certain configurations of parameters related to puncturing the first wireless service with communications of the second wireless service. For example, the parameters for each configuration may include an allocation identifier for indicating the configuration is used, a location for puncturing within a slot, other parameters related to the communications of the second wireless service, such as modulation and coding scheme (MCS), etc. The access point can allocate resources of the second wireless service to UEs using the allocation identifier, which can be transmitted to the UEs that use the second wireless service and/or can be broadcasted to other UEs (e.g., UEs that utilize the first wireless service as well). The UEs using the first wireless service can determine which resources are potentially punctured for communications of the second wireless service based on the broadcasted allocation identifiers for the UEs using the second wireless service. In addition, in this example, the access point can send an indicator for each partial slot within the slot to indicate whether the partial slot is punctured for communications of the second wireless service, but this indicator can be a single bit or a small number of bits to indicate whether the resources of the partial slot are punctured, as the UEs using the first wireless service can derive the location of the resources within the slot and/or other information based on the broadcasted allocation identifiers.

In a specific example of either multiplexing scenario described above, the first wireless service can be enhanced mobile broadband (eMBB) and the second wireless service can be ultra-reliable-low latency communications (URLLC).

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, a base station 105 may include a scheduling component 240 for scheduling resources to one or more UEs 115 to facilitate wireless communications with the UE 115 using one or more wireless services, and the UE 115 may include a communicating component 340 for receiving the resource scheduling and accordingly communicating with the base station 105 over the resources. Scheduling component 240, for example, may be configured to transmit assistance data related to resources intended for communications using a first wireless service. The assistance data may include control data indicating resources allocated for the first wireless service, allocation information of resources related to the second wireless service that are possibly punctured in the resources allocated for the first wireless service, one or more indicators specifying whether the resources are used for communications of the first wireless service or not, one or more indicators specifying whether the resources are punctured for communications of the second wireless service or not, etc., as described further herein.

In one example, communicating component 340 can then receive the assistance data to determine the resources allocated for communications using the first wireless service. The communicating component 340 may also verify whether the resources include data of the first wireless service based on the indicator. This allows the base station 105 to transmit data for multiple wireless services without requiring the UE 115 to check every time instance of the first wireless service that may correspond to communications from other wireless services. Rather, the UE 115 can check time instances corresponding to the intended resources assigned in the control data (e.g., based on associated indicators for the time instances). In another example, communicating component 340 can receive the assistance data to determine which of the resources for the first wireless service may be punctured for transmitting communications of the second wireless service. In this example, the communicating component 340 may also verify whether the resources are punctured based on the indicator. This similarly allows the base station 105 to transmit data for multiple wireless services while allowing the UE 115 to check a smaller indicator that can simply indicate whether a portion of a slot includes punctured resources. If the smaller indicator indicates that the portion of the slot includes the punctured resources, the UE 115 can decode communications around the punctured resources, which are known based on the assistance data.

Turning now to FIGS. 2-10, aspects are depicted with reference to one or more components and one or more methods that may perform the actions or operations described herein, where aspects in dashed line may be optional. Although the operations described below in FIGS. 4-5 and 7-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
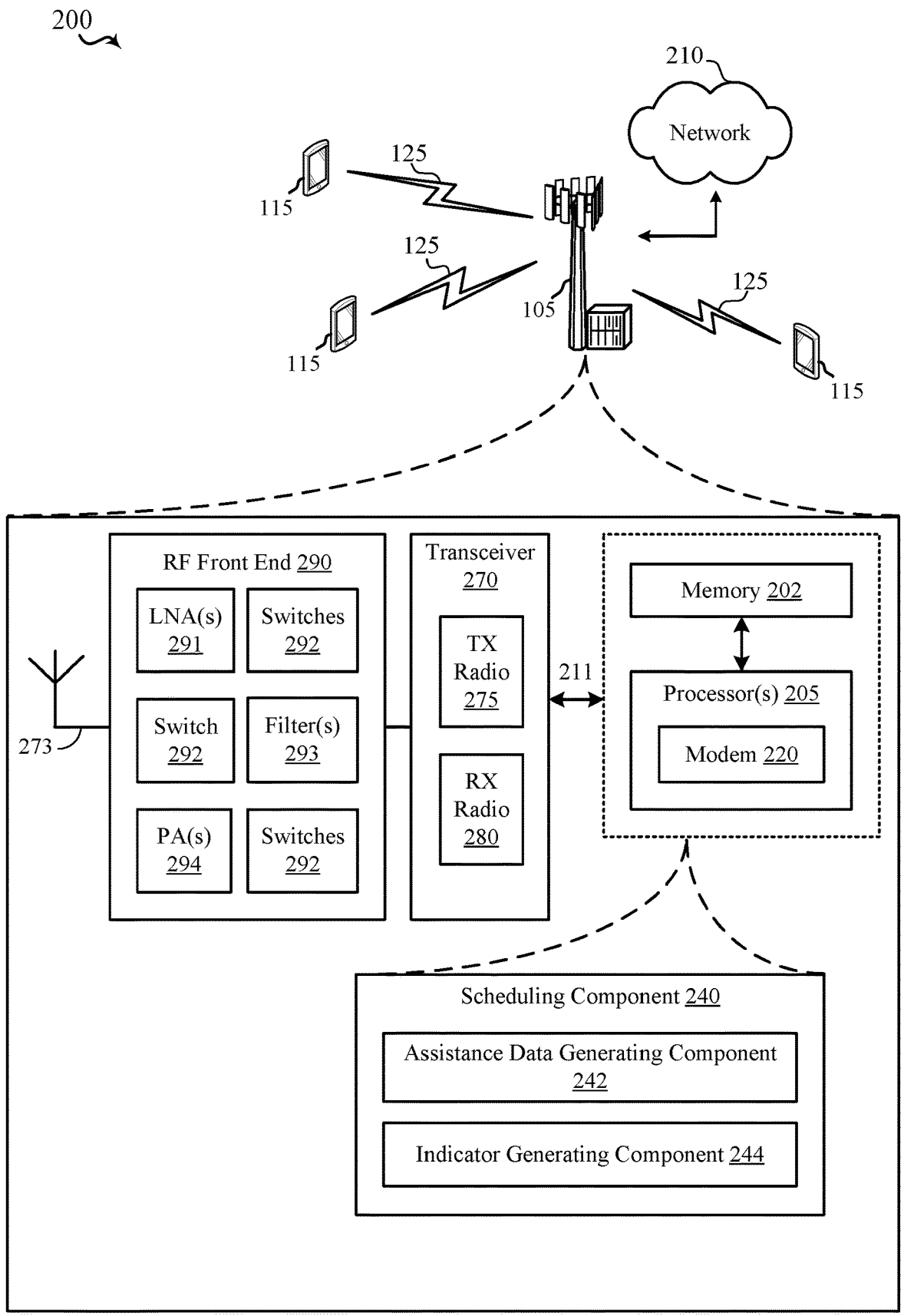
FIG. 2 is a block diagram illustrating an example of a base station, in accordance with various aspects of the present disclosure.

Referring to FIG. 2, a block diagram 200 is shown that includes a portion of a wireless communications system having multiple UEs 115 in communication with a base station 105 via communication links 125, where the base station 105 is also communicative coupled with a network 210. The UEs 115 may be examples of the UEs described in the present disclosure that are configured to receive assistance data for a first wireless service, which may include control data scheduling intended resources or an allocation identifier related to a second wireless service allocated to another UE, along with an indicator as to whether the intended resources include data of a first wireless service, an indicator as to whether a portion of a slot includes punctured resources for the second wireless service, etc. Moreover the base station 105 may be an example of the base stations described in the present disclosure (e.g., eNB, gNB, etc.) that are configured to transmit the assistance information and/or indicator described above.

In an aspect, the base station in FIG. 2 may include one or more processors 205 and/or memory 202 that may operate in combination with a scheduling component 240 to perform the functions, methods (e.g., method 400 of FIG. 4, method 700 of FIG. 7), etc., presented in the present disclosure. In accordance with the present disclosure, the scheduling component 240 may include a assistance data generating component 242 for generating and/or transmitting assistance data corresponding at least to a first wireless service, which may include control data indicating intended resources over which data for the first wireless service is intended to be communicated to/from one or more UEs 115, and/or an allocation identifier related to allocating resources of a second wireless service, which may puncture resources of the first wireless service, transmitted to one or more other UEs. Scheduling component 240 may also include an indicator generating component 244 for generating and/or transmitting an indicator of whether the intended resources include data for the first wireless service, or an indicator of whether resources associated with a portion of a slot are punctured for communications of the second wireless service.

The one or more processors 205 may include a modem 220 that uses one or more modem processors. The various functions related to the scheduling component 240, and/or sub-components thereof, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the scheduling component 240 to the UEs 115. The RF front end 290 may be communicative coupled with one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270. The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 10. Similarly, the memory 202 may correspond to the memory described in connection with the base station in FIG. 10.

Figure 3:
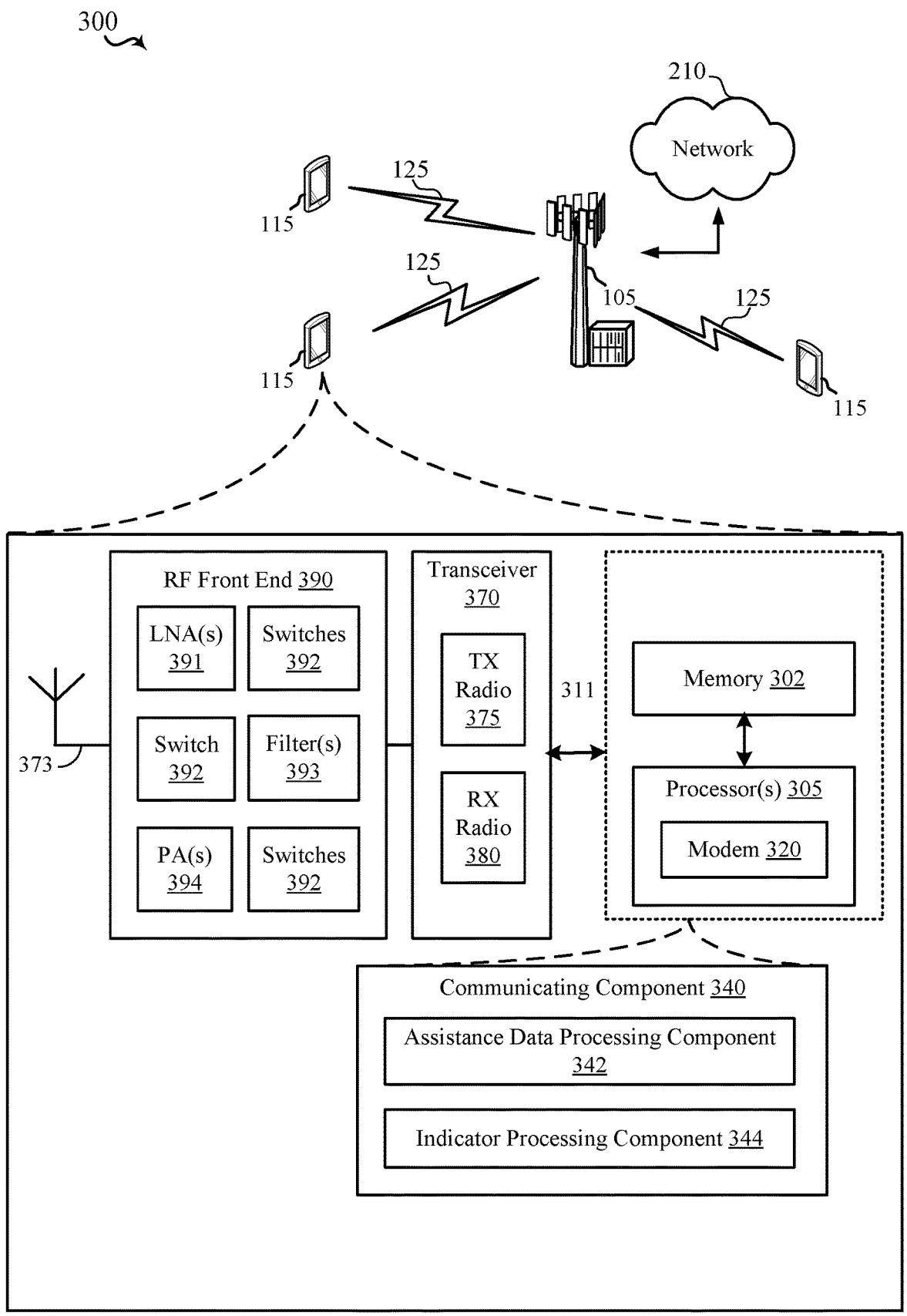
FIG. 3 is a block diagram illustrating an example of a UE, in accordance with various aspects of the present disclosure.

Referring to FIG. 3, a block diagram 300 is shown that includes a portion of a wireless communications system having multiple UEs 115 in communication with a base station 105 via communication links 125, where the base station 105 is also communicative coupled with a network 210. The UEs 115 may be examples of the UEs described in the present disclosure that are configured to receive assistance data for a first wireless service, which may include control data scheduling intended resources or an allocation identifier related to a second wireless service allocated to another UE, along with an indicator as to whether the intended resources include data of a first wireless service, an indicator as to whether a portion of a slot includes punctured resources for the second wireless service, etc. Moreover the base station 105 may be an example of the base stations described in the present disclosure (e.g., eNB, gNB, etc.) that are configured to transmit the assistance information and/or indicator described above.

In an aspect, the UE 115 in FIG. 3 may include one or more processors 305 and/or memory 302 that may operate in combination with a communicating component 340 to perform the functions, methods (e.g., method 500 of FIG. 5, method 800 of FIG. 8), etc., presented in the present disclosure. In accordance with the present disclosure, the communicating component 340 may include a assistance data processing component 342 for receiving and/or processing assistance data from a base station 105 where the assistance data may include control data that indicates intended resources for first wireless service data communications, or an allocation identifier assigned to one or more other UEs for a second wireless service. The communicating component 340 may also include an indicator processing component 344 for processing an indication from the base station 105 indicating whether the intended resources include data of the first wireless service (e.g., and/or data from one or more other wireless services), or an indication from the base station 105 indicating whether a portion of a slot for the first wireless service includes resources punctured for communicating using the second wireless service.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. The RF front end 390 may be communicatively coupled with one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 10. Similarly, the memory 302 may correspond to the memory described in connection with the UE in FIG. 10.

Figure 4:
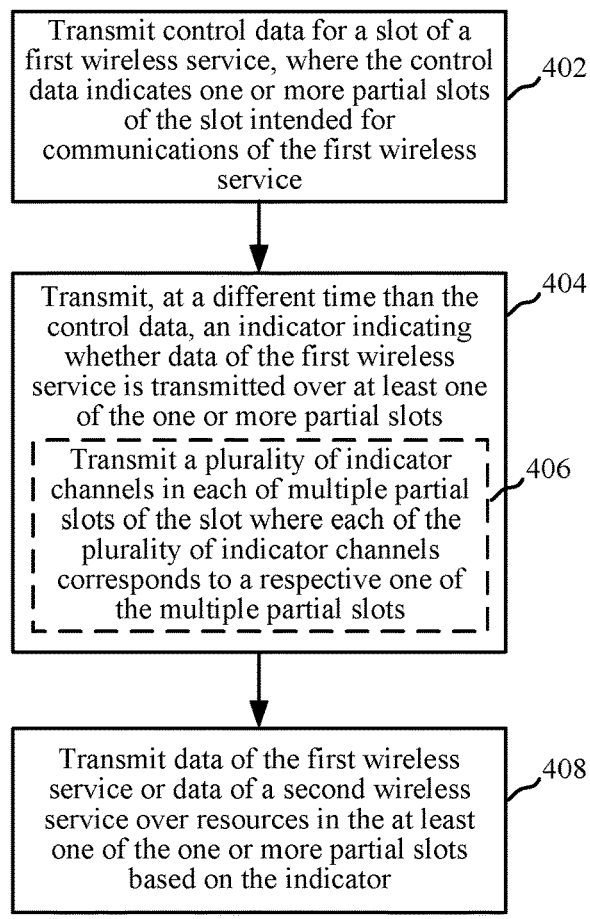
FIG. 4 is a flow chart illustrating an example of a method for transmitting control data and an indicator, in accordance with various aspects of the present disclosure.
Figure 5:
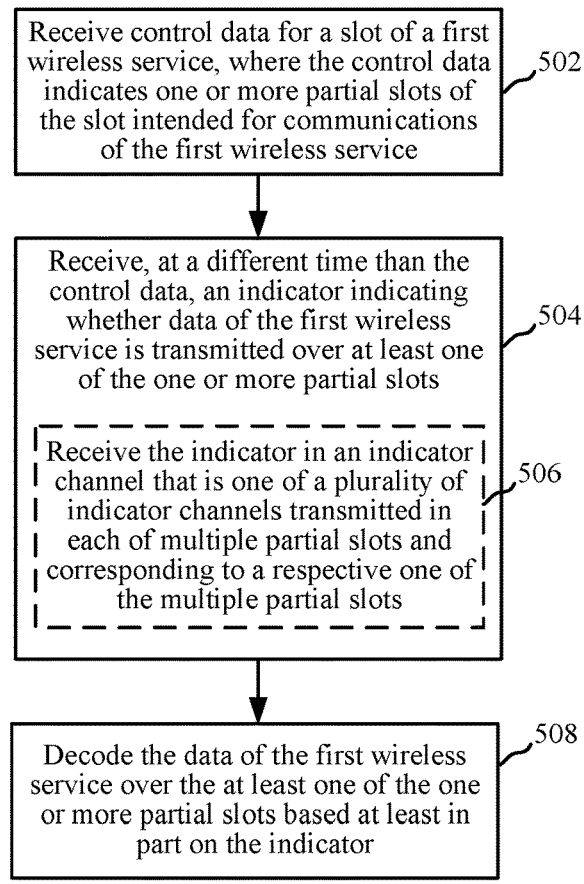
FIG. 5 is a flow chart illustrating an example of a method for receiving control data and an indicator, in accordance with various aspects of the present disclosure.

FIG. 4 illustrates a flow chart of an example of a method 400 for transmitting (e.g., by a base station) control data indicating intended resources for communicating data of a first wireless service and/or an indicator of whether data of the first wireless service is communicated over the intended resources. FIG. 5 illustrates a flow chart of an example of a method 500 for receiving (e.g., by a UE) control data indicating intended resources for communicating data of a first wireless service and/or an indicator of whether data of the first wireless service is communicated over the intended resources. In methods 400 and 500, blocks indicated as dashed boxes may represent optional steps.

In method 400, at Block 402, control data can be transmitted (e.g., by a base station) for a slot of a first wireless service, where the control data indicates one or more partial slots of the slot intended for communications of the first wireless service. In an aspect, the assistance data generating component 242 can generate, and the scheduling component 240 can transmit, e.g., in conjunction with processor(s) 205, memory 202, and/or transceiver 270, the control data for the slot of the first wireless service. The control data can indicate one or more partial slots of the slot that are intended for communications of the first wireless service. In an example, the base station 105 may not ultimately transmit communications of the first wireless service in the one or more partial slots, but instead may puncture the communications for other communications of a second wireless service.

In one example, the scheduling component 240 can transmit the control data in a partial slot, such as a first of a plurality of partial slots of the slot. In a specific example, the first wireless service can be an eMBB service, and the base station 105 may transmit associated eMBB service communications in an eMBB slot, which may be 0.5 milliseconds (ms) in duration. In one example, this can be a transmission time interval (TTI) of the eMBB service. The base station 105 may also be capable of transmitting communications for a URLLC service, as described, which may be transmitted in a partial slot (e.g., part of an eMBB slot), and/or may be transmitted based on a different TTI. For example, the URLLC service may be associated with a partial slot, also known as a mini-slot, which may have a duration (and/or be associated with a TTI that is) less than the eMBB slot (e.g., 0.042 ms, where 12 URLLC mini-slots are included in an eMBB slot, 0.1 ms where 5 URLLC mini-slots are included in an eMBB slot, 0.125 ms where 4 URLLC mini-slots are included in an eMBB slot, etc.). In an example, the eMBB slot can include a collection of orthogonal frequency division multiplexing (OFDM) symbols for transmitting eMBB communications within the slot (e.g., 14 OFDM symbols for normal cyclic prefix or 12 OFDM symbols for extended cyclic prefix). The eMBB slot may be the sampling timing duration (e.g., transmission time interval, etc.) for eMBB communications. The URLLC mini-slots may include an integer number of OFDM symbols (e.g., 2, 4, 7, etc.). In addition, the URLLC mini-slots may (or may not) align to the eMBB slot in the granularity of OFDM symbol boundaries (in time). Thus, for example, a URLLC mini-slot may be configured to begin at a same or different time than an OFDM symbol in an eMBB slot and/or may last a duration that is the same as or different from the OFDM symbol. The URLLC mini-slot may be the sampling timing duration (e.g., transmission time interval, etc.) for URLLC communications.

Figure 6:
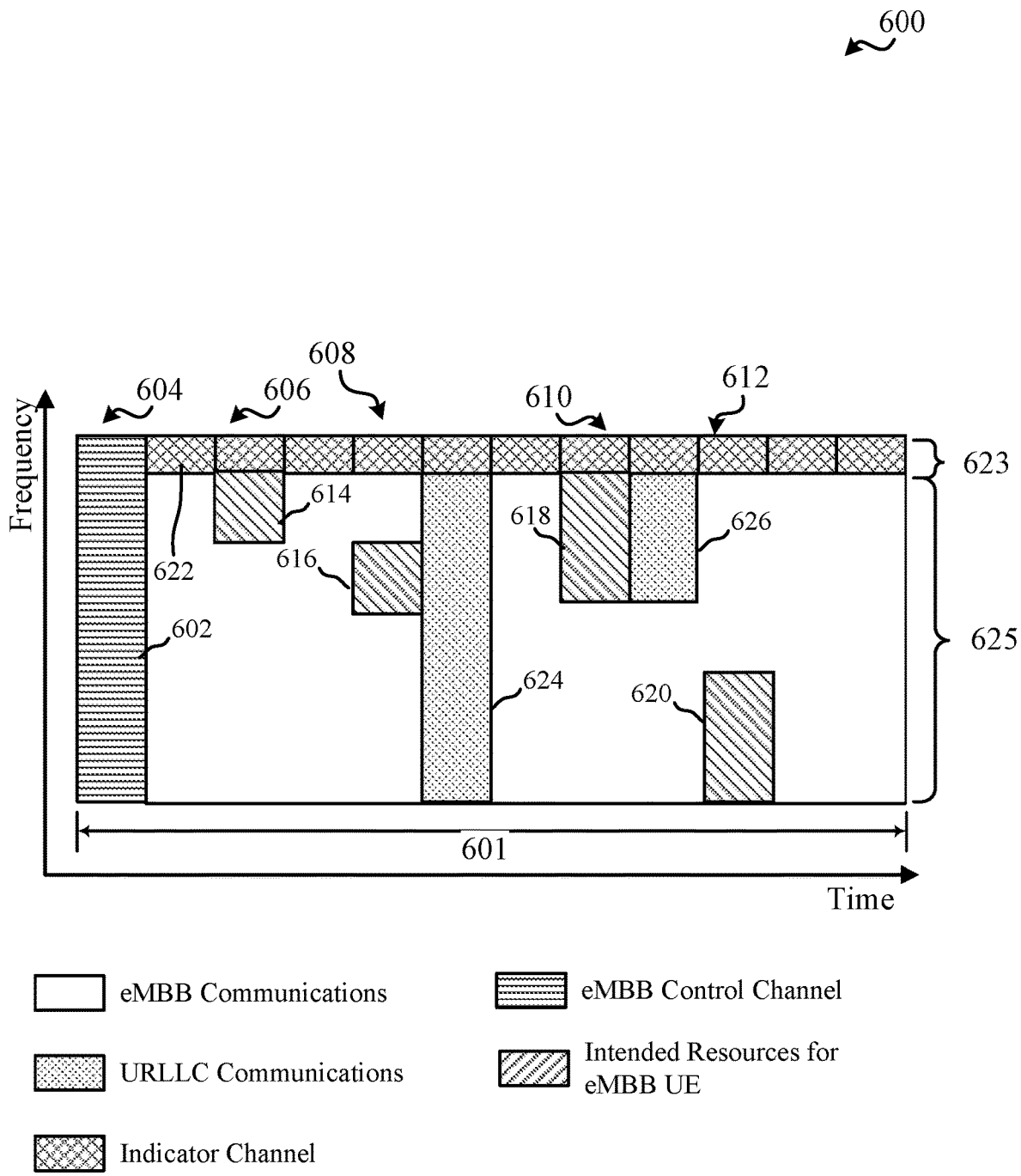
FIG. 6 illustrates an example of an allocation of frequency and time resources with a control channel and one or more indicator channels, in accordance with various aspects of the present disclosure.

A specific example is shown in FIG. 6, which illustrates an example of an allocation 600 of time and frequency resources for transmitting data for an eMBB service and a URLLC service in an eMBB slot 601. In this example, the base station can transmit an eMBB control channel 602 in partial slot 604 of the eMBB slot 601. In an example, the partial slot 604 (and/or the other partial slots depicted in eMBB slot 601) can be a URLLC partial slot, or can be of similar size as a URLLC partial slot. The eMBB control channel 602 can indicate intended resources for communicating eMBB data with the UE 115 (e.g., and/or with other UEs), including frequency resources in partial slots 606, 608, 610, 612, as shown at 614, 616, 618, 620. In an example, transmitting control data in partial slot 604 can reduce control overhead and monitoring periodicity when compared to a scheduling-based multiplexing of eMBB and URLLC, described above. In an example, the control data may include a scheduling grant indicating the intended resources for eMBB communications, a corresponding modulation and coding scheme (MCS), one or more indicators (e.g., for retransmission or new data), etc. Moreover, the control data can apply to multiple UEs and intended resources may be overlapped, such that a given set of resources are indicated as intended resources for multiple UEs served by the base station 105.

In method 500, at Block 502, control data can be received (e.g., by a UE) for a slot of a first wireless service, where the control data indicates one or more partial slots of the slot intended for communications of the first wireless service. In an aspect, communicating component 340 can receive, and assistance data processing component 342 can process, e.g., in conjunction with processor(s) 305, memory 302, and/or transceiver 370, the control data for the slot of (e.g., corresponding to) the first wireless service. In an example, the control data can include control data transmitted by the base station 105, as described in reference to Block 402 in method 400. As described, communicating component 340 can receive the control data in a partial slot (e.g., a first partial slot 604, as shown in FIG. 6). In an example, the UE 115 can accordingly determine the resources over which the first wireless service communications are expected to be communicated (e.g., received from the base station 105). For example, at least one of the location of the control data (e.g., as in a first partial slot of an eMBB slot), the number or location of partial slots in the slot, etc., may be known by or otherwise configured to the UE 115, received by the UE 115 in broadcast data from the base station 105, etc. In addition, for example, the UE 115 can determine the assigned intended resources along with other information indicated in the control data, such as an MCS, indicators, etc., as described, for receiving data over the intended resources.

In method 400, at Block 404, an indication indicating whether data of the first wireless service is transmitted over at least one of the one or more partial slots can be transmitted (e.g., by the base station) at a different time than the control data. In an aspect, the indicator generating component 244 can generate, and the scheduling component 240 can transmit, e.g., in conjunction with processor(s) 205, memory 202, and/or transceiver 270, the indicator indicating whether data of the first wireless service is transmitted over at least one of the one or more partial slots, and may do so at a different time than when the control data is transmitted. For example, the scheduling component 240 can transmit the indicator in a different partial slot of the slot for the first wireless service.

In one example, in transmitting the indicator at Block 404, a plurality of indicator channels can be transmitted (e.g., by the base station) in each of multiple partial slots of the slot where each of the plurality of indicator channels corresponds to a respective one of the multiple partial slots at Block 406. For example, the scheduling component 240 can transmit a plurality of indicators in indicator channels that correspond to each of the multiple partial slots of the slot (e.g., except a slot over which the control data is transmitted), where the indicator channels can be transmitted in the corresponding partial slots.

Referring to the specific example in FIG. 6, each partial slot (e.g., other than partial slot 604) can have an associated indicator channel 622, where the indicator channel can indicate whether the partial slot includes data of the first wireless service (e.g., eMBB) and/or data of another wireless service (e.g., URLLC). The indicator channel, for example, can be defined in a portion of frequency resources 623 at the beginning of the partial slot, where the remaining portion of frequency resources 625 in the partial slot can be used for eMBB and/or URLLC communications. Other configurations or locations for the indicator channel within the partial slot can be used (e.g., an end of the partial slot, some portion of the center of the partial slot, etc.).

For example, the indicator channel (e.g., each indicator channel) can include a one-bit indicator that specifies whether the corresponding partial slot includes only data of the first wireless service or is punctured to include data of the second wireless service. In another example, the indicator can specify specific resources within the partial slot that include data of the first wireless service and/or specific resources within the partial slot that include data of another wireless service (e.g., or otherwise do not include data of the first wireless service). In the depicted example, partial slots 624 and 626 may include URLLC data punctured in the eMBB slot. In this example, the corresponding indicator channels can indicate that the partial slots 624, 626 are punctured (and/or can indicate a portion of frequency resources in the corresponding partial slots 624, 626 that are punctured) for URLLC data. In one example, the corresponding indicators may additionally or alternatively indicate that the partial slots 624, 626 do not include eMBB data (or a portion of resources in the partial slots 624, 626 that do not include eMBB data).

In method 500, at Block 504, an indicator indicating whether data of the first wireless service is transmitted over at least one of the one or more partial slots can be received (e.g., by the UE) at a different time than the control data. In an aspect, the communicating component 340 can receive, and the indicator processing component 344 can process, e.g., in conjunction with processor(s) 305, memory 302, and/or transceiver 370, the indicator indicating whether data of the first wireless service is transmitted over at least one of the one or more partial slots. In an example, the indicator may correspond to the at least one partial slot, as shown in FIG. 6. For example, partial slots 606, 608, 610, 612 can each have an indicator channel with an indicator indicating whether the intended resources assigned to the UE 115 include data from the first wireless service (e.g., eMBB). For example, the location of the indicator (e.g., as in a certain portion of frequency in the partial slot) may be known by or otherwise configured to the UE 115, received by the UE 115 in broadcast data from the base station 105, etc.

In one example, in receiving the indicator at Block 504, the indicator can be received (e.g., by the UE) in an indicator channel that is one of a plurality of indicator channels transmitted in each of multiple partial slots and corresponding to a respective one of the multiple partial slots at Block 506. For example, the indicator processing component 344 can process (and/or the communicating component 340 can receive) the indicator channels (e.g., indicator channel 622) corresponding to each of the one or more partial slots indicated in the control data, as including intended first wireless service resources, to determine whether or not to attempt to receive and/or decode first wireless service data over the one or more partial slots. For example, referring to FIG. 6, the UE 115 may receive and process a subset of the indicator channels, such as the indicator channels corresponding to partial slots 606, 608, 610, 612, over which intended resources 614, 616, 618, 620 are assigned (e.g., based on the control data in the eMBB control channel 602 for the UE 115). If the indicator channel for a corresponding partial slot indicates that the partial slot is or has resources that are punctured for second wireless service communications, the UE 115 can refrain from including the slot (or related resources) in decoding communications of the first wireless service.

As described, in an example, the indicator channel can include a one-bit indicator indicating that a corresponding partial symbol includes data for the first wireless service or is punctured with data from another wireless service. In another example, the indicator channel can include an indicator indicating one or more portions of resources within a corresponding partial symbol that include data for the first wireless service or are punctured with data from another wireless service. In an example, UE 115 may have been assigned intended resources in partial slots 624 and/or 626 as well, but can determine not to process/receive data over the partial slots 624 and/or 626 based on an indication in the corresponding indicator channels. For example, the corresponding indicator channels can indicate that the partial slots 624 and/or 626 are punctured, or that resources including, overlapping, etc., the intended resources are punctured within the partial slot 624 and/or 626, and/or the like.

In method 400, at Block 408, data of the first wireless service or data of the second wireless service can be transmitted (e.g., by the base station) over resources in the at least one of the one or more partial slots based on the indicator. In an aspect, the scheduling component 240, e.g., in conjunction with processor(s) 205, memory 202, and/or transceiver 270, can transmit, based on the indicator, the data of the first wireless service and/or data of the second wireless service over resources in the at least one of the one or more partial slots. For example, scheduling component 240 can puncture resources in the at least one of the one or more partial slots with data from the second wireless service (e.g., URLLC, as in partial slots 624, 626) where the indicator in the corresponding indicator channel indicates that the partial slot does not include data of the first wireless service (e.g., at least at the scheduled resource locations for the first wireless service), or indicates that the partial slots otherwise includes data of the second wireless service. In another example, the scheduling component 240 can transmit data of the first wireless service in resources in the at least one of the one or more partial slots (e.g., eMBB, as in partial slots 606, 608, 610, 612) where the indicator in the corresponding indicator channel indicates that the partial slot includes data of the first wireless service (e.g., at least at the scheduled resource locations for the first wireless service), or indicates that the partial slot is otherwise not punctured with data for the second wireless service.

In method 500, at Block 508, data of the first wireless service can be decoded (e.g., by the UE) over the at least one of the one or more partial slots based at least in part on the indicator. In an aspect, the communicating component 340, e.g., in conjunction with processor(s) 305, memory 302, and/or transceiver 370, can decode the data of the first wireless service over (e.g., from) the at least one of the one or more partial slots based at least in part on the indicator. For example, as described, the communicating component 340 can determine to decode data over the at least one of the one or more partial slots where the indicator in the indicator channel corresponding to the at least one slot indicates that the at least one slot includes data of the first wireless service (e.g., or otherwise that the at least one slot is not punctured with data of another wireless service). Moreover, one reference signal can be transmitted by the base station 105 over a given slot of the first wireless service (e.g., in a partial slot or other collection of resources in the slot 601). In this example, the communicating component 340 can use this reference signal to decode data within the slot to reduce reference signal overhead, in an example. In addition, decoding of the data at Block 508 may include performing cyclic redundancy check on the data as part of processing to ensure the received data is valid (e.g., which can mitigate errors in the case that the indicator channel is possibly falsely decoded).

Figure 7:
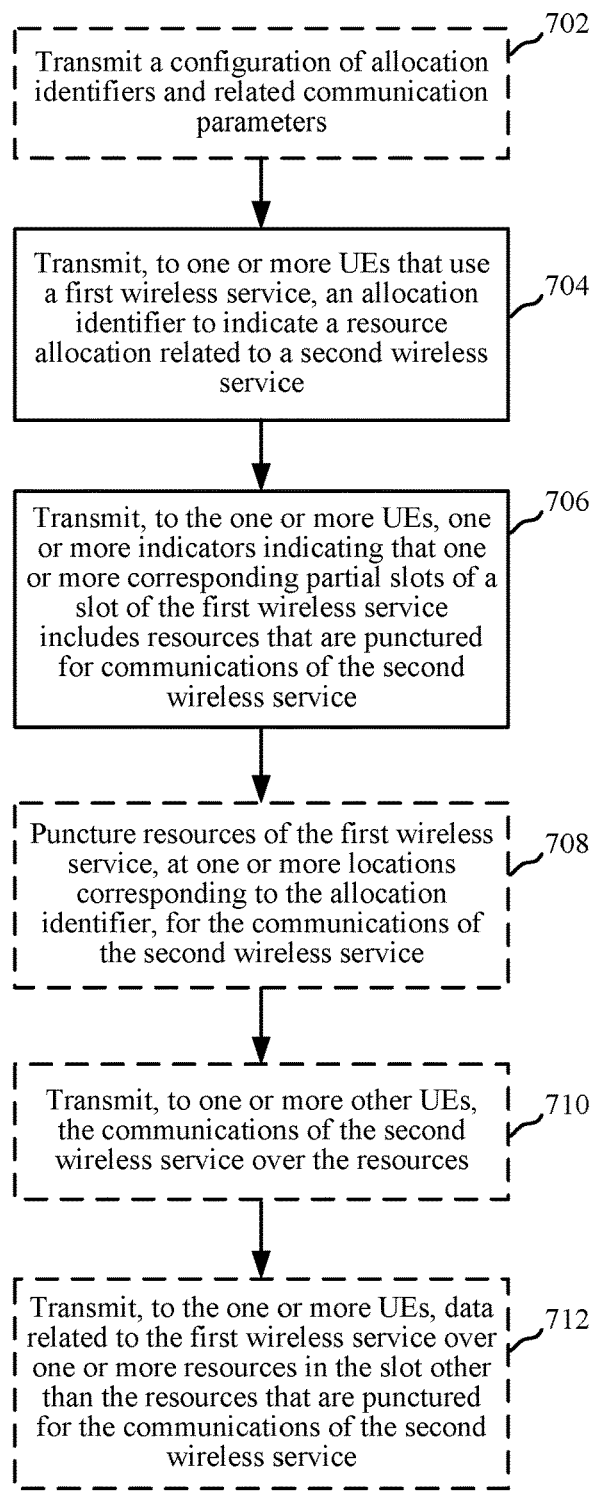
FIG. 7 is a flow chart illustrating an example of a method for transmitting an allocation identifier and indicator, in accordance with various aspects of the present disclosure.
Figure 8:
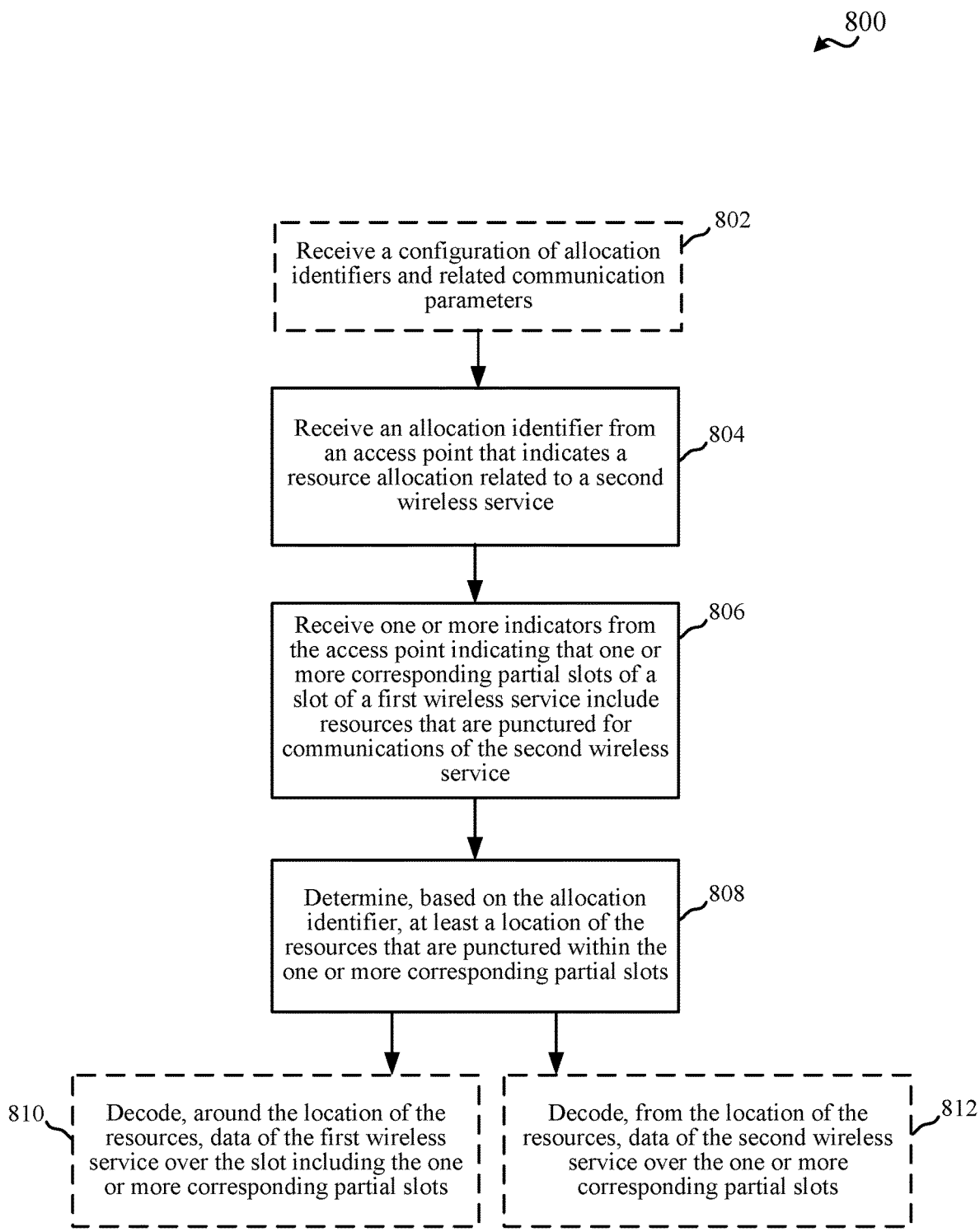
FIG. 8 is a flow chart illustrating an example of a method for receiving an allocation and indicator, in accordance with various aspects of the present disclosure.

FIG. 7 illustrates a flow chart of an example of a method 700 for transmitting (e.g., by a base station) allocation identifiers indicating resources for possibly puncturing for communicating data of a second wireless service and/or an indicator of whether resources in a given partial slot are punctured. FIG. 8 illustrates a flow chart of an example of a method 800 for receiving (e.g., by a UE) allocation identifiers indicating resources for possibly puncturing for communicating data of the second wireless service and/or an indicator of whether resources in a given partial slot are punctured. In methods 700 and 800, blocks indicated as dashed boxes may represent optional steps.

In method 700, optionally at Block 702, a configuration of allocation identifiers and related communication parameters can be transmitted. In an aspect, the assistance data generating component 242 can generate, and the scheduling component 240 can transmit, e.g., in conjunction with processor(s) 205, memory 202, and/or transceiver 270, the configuration of allocation identifiers and related communication parameters. For example, the configuration may include a table or another structure that indicates allocation identifiers for a second wireless service, as described (e.g., URLLC), and related communication parameters, such as resource locations for puncturing first wireless service (e.g., eMBB) resource locations with communications for the second wireless service when the allocation identifier is assigned, modulation and coding scheme (MCS) for transmitting the second wireless service communications, etc. In one example, the scheduling component 240 can transmit the configuration using radio resource control (RRC) or other higher layer signaling, using a control channel (e.g., physical downlink control channel (PDCCH), etc.) of the first wireless service, etc. In this example, a UE that uses the first wireless service and/or a UE that uses the second wireless service can receive and process the control channel.

In method 800, optionally at Block 802, a configuration of allocation identifiers and related communication parameters can be received. In an aspect, communicating component 340 can receive, and assistance data processing component 342 can process, e.g., in conjunction with processor(s) 305, memory 302, and/or transceiver 370, the configuration of allocation identifiers and related communication parameters. As described, for example, communicating component 340 can receive the configuration via the RRC or higher layer signaling, over the control channel, etc. In other examples, communicating component 340 may additionally or alternatively obtain the configuration from a memory 302 of the UE 115 or a configuration received from another network entity. In either case, in another example, scheduling component 240 may transmit, and communicating component 340 may receive (e.g., over RRC, PDCCH, etc.), an override of a previous or default configuration that can indicate a different list of allocation identifiers and/or associated resource locations, MCS, etc.

More specifically, for example, the allocation identifier can be used to indicate resource locations (e.g., in one or more time divisions of the second wireless service, such as partial slots for URLLC communications, resource blocks within one or more partial slots, sub-bands within one or more partial slots, etc.) where communications of the first wireless service may be punctured with communications of the second wireless service. The allocation identifiers may additionally indicate other parameters related to the second wireless service communications, such as MCS, etc. In addition, the allocation identifier can be an index from 1 to N, where N can be a number of possible configurations. For example, the configurations may be specified in a table with N entries where each entry can include an allocation identifier, one or more resource locations in a slot, MCS, etc. related to second wireless service communications. For example, the resource locations may include an indication of a partial slot index within the slot, a collection of resource blocks, sub-bands, subcarriers, etc. within the partial slot, and/or the like, for possibly puncturing the first wireless service slot for the second wireless service communications at the resource locations.

Thus, UEs that use the second wireless service can be assigned allocation identifiers for determining resources over which to possibly communicate with the base station 105 via the second wireless service. In addition, in this regard, UEs that use the first wireless service can also receive one or more allocation identifiers that are assigned to one or more UEs that communicate with the base station 105 using the second wireless service. In addition, in this example, the one or more UEs can determine possible puncturing locations for the communications using the second wireless service based on the one or more allocation identifiers and the configuration (e.g., table) received from the base station 105 and/or memory 302.

For example, the allocation identifier can relate to one of multiple configurations for puncturing resources of the first wireless service to communicate data related to the second wireless service. In an example, multiple configurations can be defined at the base station 105 and at the UE 115 such that communicating the allocation identifier allows the base station 105 and the UE 115 to determine the same configuration parameters for puncturing the resources. In an example, the base station 105 may store a mapping of configuration parameters to allocation identifiers, and may assign an allocation identifier to a UE that uses the second wireless service. In this example, the base station 105 may configure communication for a UE using the second wireless service based on the configuration parameters associated with an assigned allocation identifier. This may include, for example, puncturing resources of the first wireless service in resource locations corresponding to the allocation identifier, using an associated MCS when communicating with the UE using the second wireless service, etc., based on the allocation identifier. In one example, base station 105 may configure multiple UEs (e.g., UEs that use the first wireless service and/or UEs that use the second wireless service) with the information mapping the allocation identifiers to resource locations (e.g., the configuration transmitted in Block 702). In another example, the UE(s) 115 may otherwise store such information in subscription information (e.g., in a memory of the UE), and/or the like, as described. In either case, the UE(s) using the first wireless service can determine possible resources to be punctured based on one or more allocation identifiers received for one or more UEs using the second wireless service. In addition, for example, UE(s) using the second wireless service may determine resources for communicating based on the allocation identifier transmitted to the UE(s).

In method 700, at Block 704, an allocation identifier can be transmitted (e.g., by a base station), to one or more UEs that use a first wireless service, to indicate a resource allocation related to a second wireless service. In an aspect, the assistance data generating component 242 can generate, and the scheduling component 240 can transmit, e.g., in conjunction with processor(s) 205, memory 202, and/or transceiver 270, and to the one or more UEs that use the first wireless service, the allocation identifier to indicate a resource allocation related to the second wireless service. For example, assistance data generating component 242 can transmit the allocation identifier to the one or more UEs using RRC or other higher layer signaling, and/or may broadcast the allocation identifier to the one or more UEs. For example, the one or more UEs can include a UE to receive the allocation for the second wireless service (e.g., a URLLC UE) and can include one or more other UEs communicating (e.g., with the base station 105) using the first wireless service (e.g., eMBB UEs). The base station 105 also transmits the allocation identifier, or an associated resource allocation, to the UE that uses the second wireless service to indicate resources over which the base station 105 may possibly communicate with the UE using the second wireless service within the first wireless service resources.

In method 800, at Block 804, an allocation identifier can be received (e.g., by a UE communication using a first wireless service) from an access point that indicates a resource allocation related to a second wireless service. In an aspect, communicating component 340 can receive, and assistance data processing component 342 can process, e.g., in conjunction with processor(s) 305, memory 302, and/or transceiver 370, an allocation identifier from an access point, where the allocation identifier indicates the resource allocation related to the second wireless service. In an example, communicating component 340 can receive the allocation identifier over RRC signaling from the base station 105. In an example, the base station 105 can transmit, and the UE 115 can receive, the allocation identifier when the base station 105 assigns an allocation identifier to another UE (e.g., to a UE using the second wireless service). In another example, the base station 105 can transmit, and the UE 115 may receive, during configuration of the UE 115, a list of allocation identifiers assigned by the base station 105 to other UEs, etc. In another example, the UE using the second wireless service can receive the allocation identifier and can determine resource locations over which the base station 105 may possibly transmit second wireless communications to the UE, as described further herein.

In method 700, at Block 706, one or more indicators can be transmitted (e.g., by the base station) to the one or more UEs, where the one or more indicators indicate that one or more corresponding partial slots of a slot of the first wireless services includes resources that are punctured for communications of the second wireless service. In an aspect, the indicator generating component 244 can generate, and the scheduling component 240 can transmit, e.g., in conjunction with processor(s) 205, memory 202, and/or transceiver 270, and to the one or more UEs, the one or more indicators indicating that the one or more corresponding partial slots of the slot of the first wireless service includes resources that are punctured for communications of the second wireless service. In an example, the one or more indicators can correspond to indicator channels at each partial slot indicating whether the resource locations corresponding to the allocation identifier that can be punctured are actually punctured in the corresponding partial slot. Other configurations of the indicators may be possible to indicate that the possibly punctured resources corresponding to one or more assigned allocation identifiers are actually punctured with communications for the second wireless service. In addition, scheduling component 240 can transmit the indicators to the UEs that communicate using the second wireless service as well, so these UEs can determine whether or not to process the resource locations in the partial slot(s) that may correspond to their respective allocation identifiers.

In method 800, at Block 806, one or more indicators can be received (e.g., by the UE 115) from the access point (e.g., base station 105) indicating that the one or more corresponding partial slots of the slot of the first wireless service include resources that are punctured for communications of the second wireless service. In an aspect, the communicating component 340 can receive, and the indicator processing component 344 can process, e.g., in conjunction with processor(s) 305, memory 302, and/or transceiver 370, the one or more indicators from the access point indicating that one or more corresponding partial slots of the slot of the first wireless service include resources that are punctured for communications of the second wireless service. This can allow the UE 115 to decode around punctured resources, as described further herein. In addition, for example, the UEs using the second wireless service can receive the indicator channel and determine resources (e.g., partial slots) that include communications of the second wireless service that are punctured into the resources related to the first wireless service for receiving and decoding the communications of the second wireless service at the associated resource locations (e.g., based on its assigned allocation identifier). As described, for example, the indicators can be received in an indicator channel or other portion of communications from the base station 105.

Figure 9:
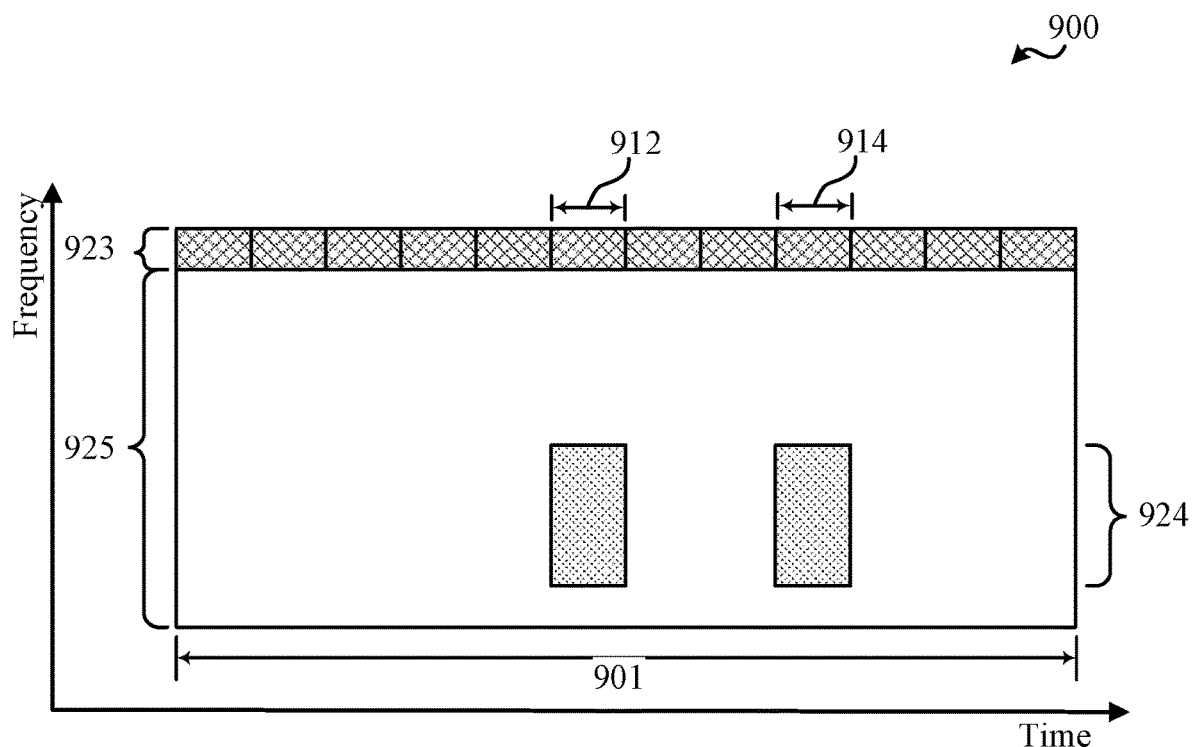
FIG. 9 illustrates an example of an allocation of frequency and time resources with one or more indicator channels, in accordance with various aspects of the present disclosure.

A specific example is shown in FIG. 9, which illustrates an example of an allocation 900 of time and frequency resources for transmitting data for an eMBB service and a URLLC service in an eMBB slot 901. In this example, the base station can transmit the indicator channel, which can for example be defined in a portion of frequency resources 923 at the beginning of one or more partial slots 912 defined within the eMBB slot 901, where the remaining portion of frequency resources 925 in the partial slot can be used for eMBB and/or URLLC communications. Other configurations or locations for the indicator channel within the partial slot can be used (e.g., an end of the partial slot, some portion of the center of the partial slot, etc.). As described, the payload (and thus size) of the indicator channel can be relatively small, as much of the information related to communicating using the second wireless service in the punctured resources can be known by the base station 105 and one or more UEs 115 based on the allocation identifier. Thus, the amount of bandwidth used to inform of punctured resources can be decreased in the eMBB slot 901, which can allow for improved throughput in the eMBB slot 901. For example, the indicator channel can include one bit to indicate whether any resources in the partial slot are punctured with communications for the second wireless service (e.g., URLLC communications, such as the portion of frequency resources 924 in two partial slots of the eMBB slot 901). In another example, the indicator channel may include enough bits to identify (e.g., by the allocation identifier index) which allocation identifier have punctured resources in the corresponding partial slot (e.g., where a given partial slot may be punctured for more than one allocation identifier).

In method 700, optionally at Block 708, resources of the first wireless service can be punctured, at one or more locations corresponding to the allocation identifier, for the communications of the second wireless service. In an aspect, scheduling component 240, e.g., in conjunction with processor(s) 205, memory 202, and/or transceiver 270, can puncture the resources of the first wireless service, at the one or more locations corresponding to the allocation identifier, for communications of the second wireless service. For example, scheduling component 240 can schedule transmission of communications related to the second wireless service in resources corresponding to resource locations associated with the allocation identifier assigned to the UE that uses the second wireless service. For example, the resource locations can correspond to one or more partial slots within the slot (e.g., within an eMBB slot 901), resource blocks within the one or more partial slots, sub-bands within the one or more partial slots, etc.

In method 700, optionally at Block 710, the communications of the second wireless service can be transmitted, to one or more other UEs, over the resources, and optionally at Block 712, data related to the first wireless service can be transmitted, to the one or more UEs, over one or more resources in the slot other than the resources that are punctured for the communications of the second wireless service. In an aspect, scheduling component 240, e.g., in conjunction with processor(s) 205, memory 202, and/or transceiver 270, can transmit, to the one or more other UEs, the communications of the second wireless service over the resources, and/or can transmit, to the one or more UEs, data related to the first wireless service over one or more resources in the slot other than the resources that are punctured for the communications of the wireless service. For example, referring to the specific example in FIG. 9, the scheduling component 240 can transmit, to the one or more other UEs, URLLC communications at resource locations in frequency resources 924 in corresponding partial slots 912 and 914, and eMBB communications to the one or more UEs in the remainder of the slot 901. In one example, scheduling component 240 can also transmit the communications of the second wireless service (e.g., URLLC) based on the MCS associated with the allocation identifier assigned to one or more of the other UEs. In addition, in one example, transmitting the communications of the first wireless service and the second wireless service may occur over different TTIs, respectively. For example, the first wireless service may be based on a slot TTI and the second wireless service may be based on a partial slot TTI, as described herein.

In method 800, at Block 808, at least a location of the resources that are punctured within the one or more corresponding partial slots can be determined based on the allocation identifier. In an aspect, communicating component 340, e.g., in conjunction with processor(s) 305, memory 302, and/or transceiver 370, can determine, based on the allocation identifier, at least the location of the resources that are punctured within the one or more corresponding partial slots. For example, the allocation identifier can relate to certain resources within a slot of the first wireless service (e.g., an eMBB slot) that can be punctured for communicating data of a second wireless service (e.g., URLLC). Thus, as described, the communicating component 340 can determine a collection of resources punctured for communications to one or more other UEs that use the second wireless service based on one or more allocation identifiers received from the base station 105. In addition, the communicating component 340 can determine associated resource locations within the slot of the first wireless service that are known or configured to correspond to the allocation identifier (e.g., partial slot locations within the slot, certain frequency locations—e.g., a collection of subcarriers) within the partial slot(s), etc.).

In method 800, optionally at Block 810, data of the first wireless service can be decoded, around the location of the resources, over the slot including the one or more corresponding partial slots. In an aspect, communicating component 340, e.g., in conjunction with processor(s) 305, memory 302, and/or transceiver 370, can decode, around the location of the resources, data of the first wireless service over the slot including the one or more corresponding partial slots, where the UE 115 uses the first wireless service to communicate with the base station. For example, communicating component 340 can discard the resources at these locations in decoding the data. This may include performing rate matching around (e.g., without including) the resources at locations defined for the allocation identifier(s) received for other UEs that use the second wireless service, and for which an indicator channel of the corresponding partial slot indicates that the resource locations related to the allocation identifier are punctured. In the specific example of FIG. 9, where indicator channels in partial slots 912, 914 indicate that the partial slots 912, 914 contain punctured resources, communicating component 340 can rate match around resource locations in frequency resources 924 in the partial slot that are known or configured to be used for a certain allocation identifier assigned to the other UEs.

In method 800, optionally at Block 812, data of the second wireless service can be decoded, from the location of the resources, over the one or more corresponding partial slots. In an aspect, communicating component 340, e.g., in conjunction with processor(s) 305, memory 302, and/or transceiver 370, can decode, from the location of the resources, data of the second wireless service over the one or more corresponding partial slots, where the UE 115 uses the second wireless service to communicate with the base station. In this regard, the UE that uses the second wireless service can skip decoding of one or more partial slots that do not include the proper indicator for the associated allocation identifier, which can conserve processing resources on the UE.

In an example, using the indicator channel and puncturing resources in partial slots indicated as punctured in the indicator channel can allow the base station 105 to transmit communications of the second wireless service in an aperiodic manner, which can be beneficial for bursty traffic profiles, and can also allow for transmitting new transmissions and/or retransmissions without requiring distinguished resources for such transmissions. Thus, a UE using the first wireless service can decode around the resources for the second wireless service, which can be indicated as punctured in near real-time (e.g., using the indicator channel) and using minimal overhead (e.g., one or more bits in the indicator channel that rely on previously transmitted allocation identifiers and associated configuration information).

Figure 10:
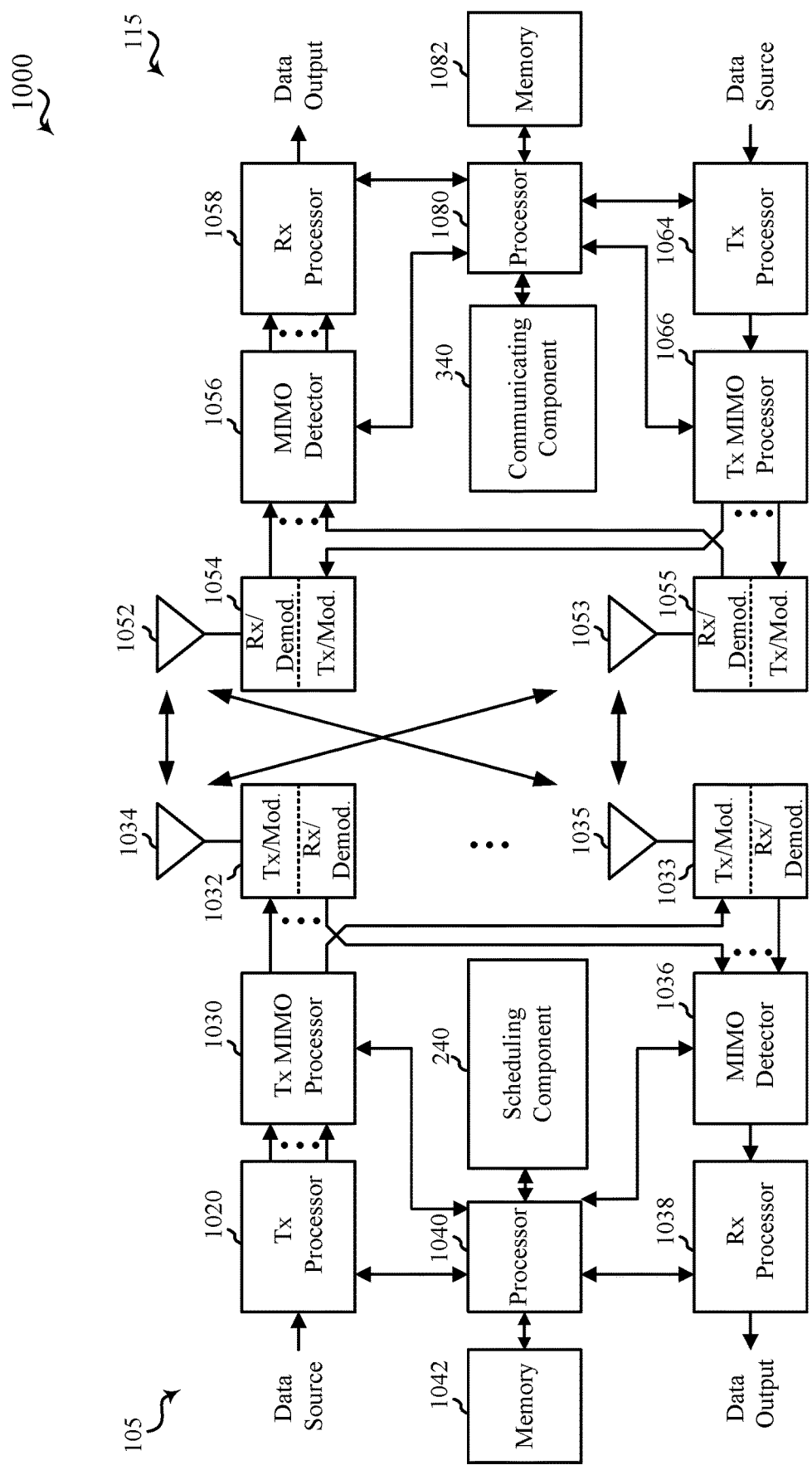
FIG. 10 is a block diagram illustrating an example of a MIMO communication system including a base station and a UE, in accordance with various aspects of the present disclosure.

FIG. 10 is a block diagram of a MIMO communication system 1000 including a base station 105 and a UE 115. The MIMO communication system 1000 may illustrate aspects of the wireless communication system 100 described with reference to FIG. 1. The base station 105 may be an example of aspects of the base station 105 described with reference to FIGS. 1, 2, and 3. The base station 105 may be equipped with antennas 1034 and 1035, and the UE 115 may be equipped with antennas 1052 and 1053. In the MIMO communication system 1000, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 115 may be an example of aspects of the UEs 115 described with reference to FIGS. 1, 2, and 3. At the UE 115, the UE antennas 1052 and 1053 may receive the DL signals from the base station 105 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 115 to a data output, and provide decoded control information to a processor 1080, or memory 1082.

The processor 1080 may in some cases execute stored instructions to instantiate a communicating component 340 (see e.g., FIGS. 1 and 3).

On the uplink (UL), at the UE 115, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 105 in accordance with the communication parameters received from the base station 105. At the base station 105, the UL signals from the UE 115 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a scheduling component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for receiving wireless communications, comprising:
    receiving, at a user equipment (UE), control data for a slot, wherein the slot is allocated as a transmission time interval (TTI) for communications, wherein the control data indicates one or more partial slots of the slot that are intended for the UE for communications, wherein the slot includes multiple partial slots, wherein the one or more partial slots do not include all of the multiple partial slots of the slot, and wherein each of the multiple partial slots has a duration that is less than the TTI;
    where an indicator indicating whether data is transmitted for the UE over at least one of the one or more partial slots is received, at the UE at a different time than the control data, and where the indicator indicates that data is transmitted for the UE over the at least one of the one or more partial slots, decoding, at the UE, the data from the at least one of the one or more partial slots; and
    where the indicator is not received at the UE, refraining from decoding, at the UE, the data from the at least one of the one or more partial slots.

2. The method of claim 1, wherein the control data is received in a first partial slot of the slot, and wherein the indicator is received in the at least one of the one or more partial slots, which does not include the first partial slot of the slot.

3. The method of claim 1, further comprising receiving the indicator in an indicator channel, wherein the indicator channel is one of a plurality of indicator channels transmitted in each of multiple partial slots of the slot, and wherein the plurality of indicator channels each correspond to a respective one of the multiple partial slots.

4. The method of claim 1, further comprising receiving the indicator in an indicator channel, wherein the indicator channel is one of a plurality of indicator channels transmitted in each of multiple partial slots of the slot, and wherein decoding the data based at least in part on the indicator comprises determining indicators of a subset of the plurality of indicator channels corresponding to a portion of the multiple partial slots that include the one or more partial slots.

5. The method of claim 1, wherein the indicator is a one-bit indicator indicating whether the data is transmitted for the UE over the at least one of the one or more partial slots.

6. The method of claim 1, wherein the indicator indicates a portion of frequency resources, over the at least one of the one or more partial slots, over which the data is transmitted for the UE, and wherein determining that the indicator indicates that data is transmitted for the UE comprises determining that the portion of frequency resources include one or more portions of resources indicated in the control data.

7. The method of claim 1, wherein the communications are for an enhanced mobile broadband (eMBB) service corresponding to a sampling timing duration of the slot, and wherein the indicator indicates, per the one or more partial slots, whether data of the eMBB service or data of a non-eMBB service is transmitted for the UE in each of the one or more partial slots, wherein the non-eMBB service corresponds to a sampling timing duration of a partial slot.

8. An apparatus for receiving wireless communications, comprising:
    a transceiver for communicating one or more wireless signals via one or more antennas;
    a memory configured to store instructions; and
    one or more processors communicatively coupled with the transceiver and the memory, wherein the one or more processors are configured to:
        receive control data for a slot, wherein the slot is allocated as a transmission time interval (TTI) for communications, wherein the control data indicates one or more partial slots of the slot that are intended for the apparatus for communications, wherein the slot includes multiple partial slots, wherein the one or more partial slots do not include all of the multiple partial slots of the slot, and wherein each of the multiple partial slots has a duration that is less than the TTI;

where an indicator indicating whether data is transmitted for the apparatus over at least one of the one or more partial slots is received, at the apparatus at a different time than the control data, and where the indicator indicates that data is transmitted for the apparatus over the at least one of the one or more partial slots, decode the data from the at least one of the one or more partial slots; and where the indicator is not received at the apparatus, refrain from decoding, at the apparatus, the data from the at least one of the one or more partial slots.

9. The apparatus of claim 8, wherein the control data is received in a first partial slot of the slot, and wherein the indicator is received in the at least one of the one or more partial slots, which does not include the first partial slot of the slot.

10. The apparatus of claim 8, wherein the one or more processors are further configured to receive the indicator in an indicator channel, wherein the indicator channel is one of a plurality of indicator channels transmitted in each of multiple partial slots of the slot, and wherein the plurality of indicator channels each correspond to a respective one of the multiple partial slots.

11. The apparatus of claim 8, wherein the one or more processors are further configured to receive the indicator in an indicator channel, wherein the indicator channel is one of a plurality of indicator channels transmitted in each of multiple partial slots of the slot, and wherein the one or more processors are configured to decode the data based at least in part on determining indicators of a subset of the plurality of indicator channels corresponding to a portion of the multiple partial slots that include the one or more partial slots.

12. The apparatus of claim 8, wherein the indicator is a one-bit indicator indicating whether the data is transmitted for the apparatus over the at least one of the one or more partial slots.

13. The apparatus of claim 8, wherein the indicator indicates a portion of frequency resources, over the at least one of the one or more partial slots, over which the data is transmitted for the apparatus, and wherein the one or more processors determine that the portion of frequency resources include one or more portions of resources indicated in the control data.

14. The apparatus of claim 8, wherein the communications are for an enhanced mobile broadband (eMBB) service corresponding to a sampling timing duration of the slot, and wherein the indicator indicates, per the one or more partial slots, whether data of the eMBB service or data of a non-eMBB service is transmitted for the apparatus in each of the one or more partial slots, wherein the non-eMBB service corresponds to a sampling timing duration of a partial slot.

15. An apparatus for receiving wireless communications, comprising:

means for receiving control data for a slot, wherein the slot is allocated as a transmission time interval (TTI) for communications, wherein the control data indicates one or more partial slots of the slot that are intended for the apparatus for communications, wherein the slot includes multiple partial slots, wherein the one or more partial slots do not include all of the multiple partial slots of the slot, and wherein each of the multiple partial slots has a duration that is less than the TTI;

means for receiving, at a different time than the control data, an indicator indicating whether data is transmitted for the apparatus over at least one of the one or more partial slots; and where the means for receiving receives the indicator indicating that data is transmitted for the apparatus over the at least one of the one or more partial slots, means for decoding the data from the at least one of the one or more partial slots; and where the means for receiving does not receive the indicator, means for refraining from decoding, at the apparatus, the data from the at least one of the one or more partial slots.

16. The apparatus of claim 15, wherein the means for receiving the control data receives the control data in a first partial slot of the slot, and wherein the means for receiving the indicator receives the indicator in the at least one of the one or more partial slots, which does not include the first partial slot of the slot.

17. The apparatus of claim 15, wherein the means for receiving the indicator receives the indicator in an indicator channel, wherein the indicator channel is one of a plurality of indicator channels transmitted in each of multiple partial slots of the slot, and wherein the plurality of indicator channels each correspond to a respective one of the multiple partial slots.

18. The apparatus of claim 15, wherein the means for receiving the indicator receives the indicator in an indicator channel, wherein the indicator channel is one of a plurality of indicator channels transmitted in each of multiple partial slots of the slot, and wherein the means for decoding decodes the data based at least in part on determining indicators of a subset of the plurality of indicator channels corresponding to a portion of the multiple partial slots that include the one or more partial slots.

19. The apparatus of claim 15, wherein the indicator is a one-bit indicator indicating whether the data is transmitted for the apparatus over the at least one of the one or more partial slots.

20. The apparatus of claim 15, wherein the indicator indicates a portion of frequency resources, over the at least one of the one or more partial slots, over which the data is transmitted for the apparatus, and wherein the means for decoding determines that the portion of frequency resources include one or more portions of resources indicated in the control data.

21. The apparatus of claim 15, wherein the communications are for an enhanced mobile broadband (eMBB) service corresponding to a sampling timing duration of the slot, and wherein the indicator indicates, per the one or more partial slots, whether data of the eMBB service or data of a non-eMBB service is transmitted for the apparatus in each of the one or more partial slots, wherein the non-eMBB service corresponds to a sampling timing duration of a partial slot.

22. A non-transitory computer-readable medium, comprising code executable by one or more processors for receiving wireless communications, the code comprising code for:

code for receiving, at a user equipment (UE), control data for a slot, wherein the slot is allocated as a transmission time interval (TTI) for communications, wherein the control data indicates one or more partial slots of the slot that are intended for the UE for communications, wherein the slot includes multiple partial slots, wherein the one or more partial slots do not include all of the multiple partial slots of the slot, and wherein each of the multiple partial slots has a duration that is less than the TTI;

code for receiving, at the UE at a different time than the control data, an indicator indicating whether data is transmitted for the UE over at least one of the one or more partial slots; and where the code for receiving receives the indicator indicating that data is transmitted for the UE over the at least one of the one or more partial slots, code for decoding, at the UE, the data from the at least one of the one or more partial slots; and where the code for receiving does not receive the indicator, code for refraining from decoding, at the UE, the data from the at least one of the one or more partial slots.

23. The non-transitory computer-readable medium of claim 22, wherein the code for receiving the control data receives the control data in a first partial slot of the slot, and wherein the code for receiving the indicator receives the indicator in the at least one of the one or more partial slots, which does not include the first partial slot of the slot.

24. The non-transitory computer-readable medium of claim 22, wherein the code for receiving the indicator receives the indicator in an indicator channel, wherein the indicator channel is one of a plurality of indicator channels transmitted in each of multiple partial slots of the slot, and wherein the plurality of indicator channels each correspond to a respective one of the multiple partial slots.

25. The non-transitory computer-readable medium of claim 22, wherein the code for receiving the indicator receives the indicator in an indicator channel, wherein the indicator channel is one of a plurality of indicator channels transmitted in each of multiple partial slots of the slot, and wherein the code for decoding decodes the data based at least in part on determining indicators of a subset of the plurality of indicator channels corresponding to a portion of the multiple partial slots that include the one or more partial slots.

26. The non-transitory computer-readable medium of claim 22, wherein the indicator is a one-bit indicator indicating whether the data is transmitted for the UE over the at least one of the one or more partial slots.

27. The non-transitory computer-readable medium of claim 22, wherein the indicator indicates a portion of frequency resources, over the at least one of the one or more partial slots, over which the data is transmitted for the UE, and wherein the code for decoding determines that the portion of frequency resources include one or more portions of resources indicated in the control data.

28. The non-transitory computer-readable medium of claim 22, wherein the communications are for an enhanced mobile broadband (eMBB) service corresponding to a sampling timing duration of the slot, and wherein the indicator indicates, per the one or more partial slots, whether data of the eMBB service or data of a non-eMBB service is transmitted for the UE in each of the one or more partial slots, wherein the non-eMBB service corresponds to a sampling timing duration of a partial slot.

* * * * *